Figure 1:
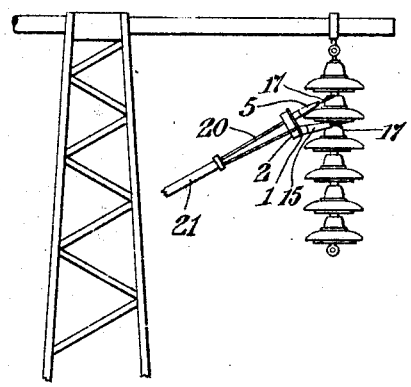

June 23, 1925.  1,542,815

C. E. BENNETT

INSTRUMENT FOR LOCATING AND OBSERVING DEFECTIVE INSULATOR UNITS

Filed June 29, 1921

Claudius E. Bennett, Inventor

By his Attorney

Patented June 23, 1925.

1,542,815

UNITED STATES PATENT OFFICE.

CLAUDIUS E. BENNETT, OF BARCELONA, SPAIN.

INSTRUMENT FOR LOCATING AND OBSERVING DEFECTIVE INSULATOR UNITS.

Application filed June 29, 1921. Serial No. 481,297.

*To all whom it may concern:*

Be it known that I, CLAUDIUS E. BENNETT, citizen of the United States, and a resident of Barcelona, Spain, have invented certain new and useful Improvements in an Instrument for Locating and Observing Defective Insulator Units, of which the following is a specification.

This invention relates to an instrument for locating and observing defective insulator units in a series of such units when subjected to an elevated difference of voltage, either direct or alternating.

The insulators or insulating units that will ordinarily be tested by use of the present instrument are commonly of the suspension type comprising insulators either suspended one above another or arranged in strain although the instrument is equally applicable to the testing of post type insulators which are made up in sections, and also to multipart pin type insulators and in general to any type of insulator made up of two or more somewhat similar insulating units which are connected together by material that is more or less conducting at high voltages.

My new instrument is a freely portable instrument of small and compact dimensions which may be used in any position and the object of this invention is to produce a method of and instrument for detecting and observing defective insulators or insulator units with convenience and celerity without endangering or disturbing the normal operation of the transmission line or electrical apparatus so insulated and without subjecting the users of the instrument to any danger whatever.

My new instrument is accordingly so made that it does not require any ground wire element or member nor could an electrical connection to ground be permitted.

The operation of the instrument is based upon the principle that when a series of two or more insulators is subjected to a high difference of potential, the total voltage is distributed over the elements according to the insulation resistance of the elements and their electrostatic capacities to each other and to ground leaving a defective unit without voltage or with less voltage than the value that corresponds to its position in the series. Under these conditions if the terminals of the instrument of my invention be placed in contact with the connecting members on opposite sides of an insulator unit, the difference of potential across the insulator and from it to ground causes the indicator to take up a position corresponding to the state of the element. The calibration of the instrument is such that the indicator does not move if the difference of potential is less than that corresponding to the voltage across a good element in the same position in the series.

My instrument is in no way a voltmeter as the deflection is not caused by the difference of voltage between the terminals alone but is due to the combined effects of the electrostatic field resulting from the difference of voltage between these terminals and the ground. Though the forces of both voltage differences are operating upon the same indicator element, the apparatus may be adjusted to regulate the relative effect of the two sets of forces, thus enabling the apparatus to be calibrated according to the voltage gradient of almost any series or chain of insulators.

The fundamental difference between my instrument operating by the action of two independent sets of electrostatic forces and the electrostatic instruments that have been built previously to utilize a single set of forces, may be illustrated and made clear by considering the difference between a wattmeter and an ammeter. The indication of an ammeter is caused by the electromagnetic field created by the current passing through the instrument and therefore an ammeter always gives a certain deviation for a certain current. In a wattmeter, on the contrary, the deviation is caused by the combined effects of voltage between the terminals and the electromagnetic field created by the current passing through the circuit to which the instrument is connected. However, the analogy should not be carried too far, as the indication of the wattmeter always depends on the product of the two effects, while my instrument is adjusted in accordance with the characteristics of the series of insulators to be tested. Usually, my instrument is adjusted so that the voltage necessary to cause a certain deviation increases with the voltage to ground, but changing the position and relative size of the pieces, the voltage necessary to cause a deflection can be made almost independent of the voltage to ground or it may even be made to decrease as the voltage to ground increases.

The manner of doing this may be understood from the construction of the instrument and the fundamental theory of its operation as explained below.

The instrument comprises in its essential elements, two electrical conductors with necessary insulating material, so disposed that they may be brought near or into contact with the conducting material at the opposed surfaces of the insulator unit or units to be tested, an indicator element that is movable under the action of the electrostatic forces from the two conductors mentioned above and that is designed to operate equally well in all positions of the instrument, a shield of conducting material used in making the adjustment of the instrument but which under certain circumstances may be suppressed, and a frame or casing which serves to support the above mentioned elements in their correct relative positions and protects the indicating element from undesirable outside influences.

Figure 2:
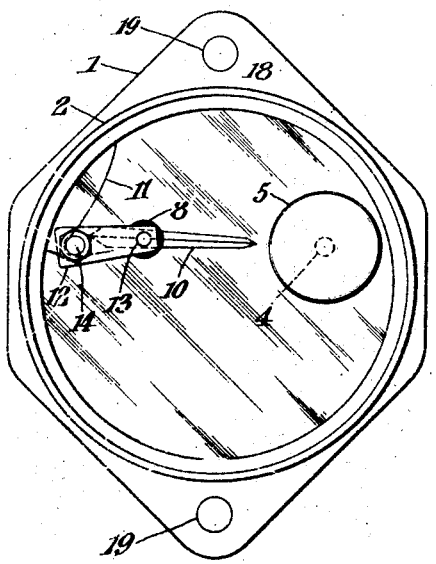
Figure 3:
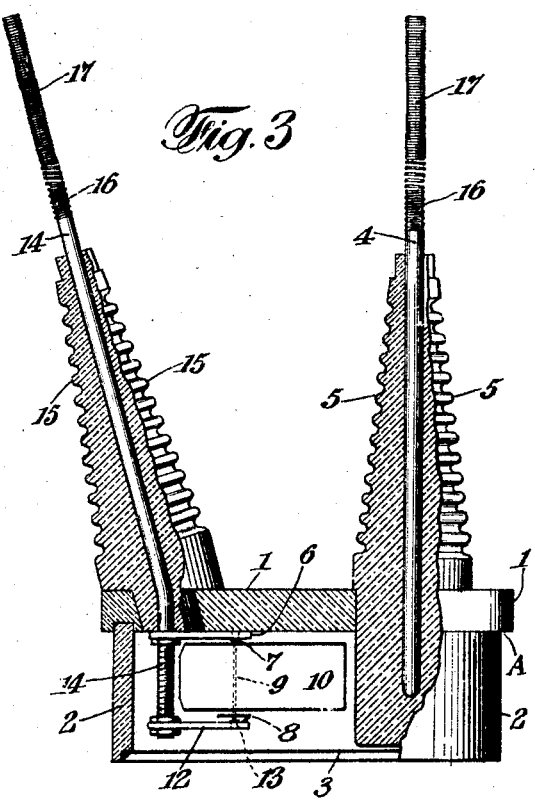

In the accompanying drawings forming a part hereof, and illustrating the principle of the present invention in the best mode now known to me of applying that principle, Fig. 1 shows a tower provided with a member from which a series of suspension insulators are suspended one above another; the view also indicates testing uses of the instrument illustrated in the other figures. Fig. 2 is a front or transparent face view of my new instrument. Fig. 3 is an elevation view of my new instrument a portion being broken away for greater clearness.

In that form of the instrument now set forth and constituting a form of instrument or apparatus by use of which my new method may be worked with celerity and safety, the cupped casing generally indicated by A comprises a thick and strong base 1, a side wall 2, which may be integral with the base if desired, and a transparent top 3, through which observations may be made. In order to make the insulating strength of the instrument as great as possible and to keep the electrostatic capacity of the instrument low, this case is preferably of some good insulating material such as bakelite for example, though the instrument would operate equally well if the case were entirely or in part of conducting material and the shielding from electrostatic influences would be more effective. A case of some such form, with a cover to protect the indicating element from undesirable outside influences is a necessity and therefore fundamental; but the form and details of construction can be varied considerably.

The base 1 serves to support the two spaced apart outwardly projecting bushings 5 and 15 which are made of appropriate electrically insulating material bored out to receive the conductors 4 and 14 which are encased therein. The bushing 5 is bored in the direction of its length part way to the inner end which passes through and is fixed to the base 1, the end of the bushing being closed so that the conductor is entirely encased at the inner end which projects for some distance inside the casing A. The bushing 15 is bored from end to end and fixed with the inner end flush with the base 1 while the conductor 14 passes inside of the casing A where it is threaded to carry two supports or brackets 6 and 12 which are held in place by nuts conveniently arranged for the purpose. In the outer ends of these supports, are fixed pivots 7 and 13 in which a pointed spindle or shaft 9 is free to turn, the axis of this spindle being at right angles to the base and transparent top. The spindle carries a fixed vane 10 which is perfectly balanced about it as an axis, the arrangement being such that the vane is free to rotate in a plane at right angles to that of the two conductors, and, being perfectly balanced, its indication is independent of the position in which the instrument may be held. The form of vane construction used in this instrument is that of an I in cross section, made of light paper, this type of construction having been selected after trial of other shapes as giving the greatest degree of lightness, rigidity and ease of construction and allowing considerable damping action by air friction. The actual form of construction selected however is one of many that would do almost equally well. Usually the entire surface of the indicator (10) is made a conductor of electricity, an effect which can be obtained by constructing the vane of conducting material or by applying to the necessary part some gold leaf or any other suitable medium. In some cases for special adjustments, the gold leaf is omitted from part or all of the short portion of the vane while in other cases it may be omitted from part of the longer portion which is nearest the shaft. As shown in the drawing, the conducting part of the indicator (10) is in communication electrically with the terminal (14) by means of the spindle (9), the spiral spring (8) and the support (12). It is not absolutely necessary that the indicator be electrically connected, as in certain cases the apparatus will give good results when the indicator is completely insulated from both conductors.

The zero position of the vane is set at right angles to a line joining the two conductors. The vane is brought to its zero position when free of other stresses by the action of the fine spiral spring 8, but it should be noted that the effect obtained by this spring can be obtained equally well by various other means such as by the use of a small magnet mounted on the spindle at right angles to the vane and attracted by an external magnet such as the conductor 4 which in this case has to be of steel and magnetized, an arrangement which was used in earlier models of the instrument.

Arranged to make contact with the conductor or terminal 14 is a screen or shield 11 of spring brass or other conducting material bent to approximately the form shown. The function of this shield is to cause repulsion of one end or the other of the vane at high voltages and in general to fix the form and density of the electrostatic field in which the indicator element moves according to the effect to be produced. The primary adjustments of the instrument are made by varying (a) the strength of the spring 8, (b) the portion of the indicator element 10 that is made a conductor, (c) the distance between the conductor 14 and the shaft 9, (d) the angle between the direction of the supports 6 and 12 and a line drawn through the centers of the two conductors 4 and 14. Quite satisfactory results may be obtained in many cases simply by adjusting these elements omitting the shield 11 entirely but its use simplifies the adjustment of the instrument and increases the range of its functions beyond what is otherwise practicable.

In order to protect the instrument from shock and vibration when it is in use, the conductors or terminals 4 and 14 are fitted with elastic contact pieces. Such elastic or yieldable connections with one of which each conductor is mechanically connected at 16 are shown in the form of closely coiled tubular springs 17. These springs or flexible conductors which extend in the direction of the length of the terminals to which they are attached are a convenience but have no necessary part in the operation of the instrument.

The base is shown provided with a flange 18 exterior to the side wall 2 as shown, this flange being provided with two holes 19 in which rods for supporting the instrument may be placed. A very convenient arrangement is to provide two light insulating rods 20 uniting to form a heavier rod 21 about which the instrument balances and which may be used conveniently for applying the terminals of the instrument to the insulator units to be tested when at a distance from the operator, as indicated in Fig. 1. When mounted in this way, the instrument is brought close to the insulator which it is desired to test, so that the terminals (4 and 14) touch the connection material of the insulator as shown in fig. 1. If the insulator which is to be tested is subjected to a high voltage or to the normal working tension, the difference of potential which exists between the terminals of the apparatus combined with the difference of potential from the apparatus and insulator to ground causes the indicator to take up a position which indicates whether the insulator being tested is in good condition or defective.

The principle of operation and especially the effect of voltage to ground by which this adjustment is secured may be understood from the following considerations:

Suppose a difference of potential exists between the terminals (4 and 14) and that the indicator element is in its zero position approximately at right angles to the position shown in the drawing, then both ends of the indicator (10) are attracted by the charge on the conductor (4) and the resulting turning moment is the difference of attraction. If the terminal (14) and consequently the indicator (10) is at earth potential, these two turning moments on opposite ends of the vane are the only forces of any importance acting to produce movement and the instrument under this special condition operates as though it were an ordinary electrostatic voltmeter. If, however, a difference of potential exists from the terminal (14) to ground as is the case in testing all but one of the insulator elements of a series, then the electrostatic "tubes of force" extend not only between the conductors (4 and 14) but also from conductor (14), from the supports (6 and 12) and from the vane (10) to ground. The mutual repulsion of these tubes of force, ordinarily referred to as the repulsion of similarly electrified bodies, also creates a turning movement on the vane so that deflection may be produced by the application of a voltage to ground even though the two terminals are at the same potential and the instrument is highly insulated from ground. According to the adjustment of the instrument this deflection may be in either direction so that the effect of increasing the voltage to ground may be either to increase or decrease the difference of potential between conductors (4 and 14), which is necessary to produce a deflection of the indicator. When the instrument is in position against an insulator unit, the indicator, which is only partly shielded by the various parts of the instrument, is still further affected by the electrostatic field from the insulator series to ground, a factor of certain importance that also must be taken into consideration in the instrument adjustment.

In résumé, the special features which distinguish my instrument and method of test from the electrostatic instruments which have been developed previously are the following:—

The indication is determined partly by the voltage difference between terminals and partly by the voltage to ground enabling the instrument to be used for testing insulators at any voltage now used for transmission lines as the compensation for the exterior field is provided for during the calibration.

The relative effects of the voltage difference between terminals and of the voltage to ground is adjustable enabling the calibration of the instrument to be adjusted to correspond to the potential gradient of the insulator series to be treated.

The high insulation resistance of the instrument combined with its low electrostatic capacity allows the testing of a series of insulators in regular service without short-circuiting any unit or disturbing its normal functioning.

The design of the indicator element enables the instrument to be used in any position and at any inclination without affecting the accuracy of the indication.

The use of solid insulating material with long leakage surfaces makes the instrument operation practically independent of atmospheric conditions short of mist or actual precipitation.

The absence of moving parts except the indicator and the extreme lightness and simplicity of this makes the instrument rugged enough to withstand the rough handling that it necessarily receives when used on a transmission line.

What I claim is:

1. A portable electrostatic instrument for detecting and observing defective insulator units in a series of such units subjected to a high difference of potential comprising in combination, two spaced apart conductors highly insulated from one another and ground arranged for taking the voltage at the opposed surfaces of the insulator unit being tested; a freely rockable indicator element balanced about its center of movement so as to be uninfluenced by the angle of inclination of the instrument and operated by the attractive and repulsive forces resulting from the combined action of the electrostatic field set up between the aforementioned conductors and the electrostatic field to ground; a case designed to facilitate the formation of the electrostatic field to ground from the above mentioned elements as well as to maintain them in their correct relative position and to protect them from undesirable outside influences.

2. A portable electrostatic instrument for detecting and observing defective insulator units in a series of such units subjected to a high difference of potential comprising in combination, two spaced apart conductors highly insulated from one another and ground arranged for taking the voltage at the opposed surfaces of the insulator unit being tested; a freely rockable and balanced indicator element of conducting material connected electrically with one of the aforementioned conductors and operated by the attractive and repulsive forces resulting from the combined action of the electrostatic field set up between the two conductors and the electrostatic field to ground; a case designed to facilitate the formation of the electrostatic field to ground from the above mentioned elements as well as to maintain them in their correct relative position and to protect them from undesirable outside influence.

3. A portable electrostatic instrument for detecting and observing defective insulator units in a series of such units subjected to a high difference of potential comprising in combination, two spaced apart conductors highly insulated from one another and ground arranged for taking the voltage at the opposite surfaces of the insulator unit being tested; a freely rockable indicator element balanced about its center of movement so as to be uninfluenced by the angle of inclination of the instrument and operated by the attractive and repulsive forces resulting from the combined action of the electrostatic field set up between the aforementioned conductors and the electrostatic field to ground; a shield of conducting material for adjusting the strength and form of the electrostatic field in which the indicator element moves; a case designed to facilitate the formation of the electrostatic field to ground from the above mentioned elements as well as to maintain them in their correct relative position and to protect them from undesirable outside influences.

4. A portable electrostatic instrument for detecting and observing defective insulator units in a series of such units subjected to a high difference of potential comprising in combination, two spaced apart conductors highly insulated from one another and ground arranged for taking the voltage at the opposed surfaces of the insulator unit being tested; a freely rockable and balanced indicator element of conducting material connected electrically with one of the aforementioned conductors and operated by the attractive and repulsive forces resulting from the combined action of the electrostatic field set up between the two conductors and the electrostatic field to ground; a shield of conducting material for adjusting the strength and form of the electrostatic field in which the indicator element moves; a case designed to facilitate the formation of the electrostatic field to ground from the above mentioned elements as well as to maintain them in their correct relative position and to protect them from undesirable outside influences.

5. A portable defective-insulator detector and observation instrument which operates equally well in all positions, for detecting and observing defective insulator units in a series of such units, or otherwise, subjected to a high voltage, comprising in combination, spaced apart conductors highly insulated from one another and from ground for taking the voltage at the opposed surfaces of the insulator unit or units being tested; an indicator element which is moved by the action of the electrostatic field resulting from the difference in voltage between the two conductors; a shield of conducting material for adjusting the strength and form of the electrostatic field in which the indicator element moves; a casing for maintaining the above elements in their correct relative position and for protecting the indicator element from undesirable outside influences.

6. A portable defective-insulator detector and observation instrument which operates equally well in all positions, for detecting and observing defective insulator units in a series of such units, or otherwise, subjected to a high voltage, comprising in combination, spaced apart conductors highly insulated from one another and from ground for taking the voltage at the opposed surfaces of the insulator unit or units being tested; a rockable balanced indicator element which is moved by the action of the electrostatic field resulting from the difference of voltage between the two conductors; a shield of conducting material for adjusting the strength and form of the electrostatic field in which the indicator element moves; a casing for maintaining the above elements in their correct relative positions and for protecting the indicator element from undesirable outside influences.

7. A portable defective-insulator detector and observation instrument which operates equally well in all positions for detecting and observing defective insulator units in a series of such units, or otherwise, subjected to a high voltage, comprising in combination, spaced apart conductors highly insulated from one another and from ground for taking the voltage at the opposed surfaces of the insulator unit or units being tested; a rockable balanced indicator element which is rockable from a normal zero position to which it is constrained to return when free of electrostatic stresses to another observable position by the action of the electrostatic field resulting from the difference of voltage between the two conductors; a shield of conducting material for adjusting the strength and form of the electrostatic field in which the indicator element moves; a casing for maintaining the above elements in their correct relative position and for protecting the indicator element from undesirable outside influences.

Signed at Barcelona, in the Kingdom of Spain this 27th day of May A. D. 1921.

CLAUDIUS E. BENNETT.